(12) United States Patent
Wasserblat et al.

(10) Patent No.: US 8,831,947 B2
(45) Date of Patent: Sep. 9, 2014

(54) METHOD AND APPARATUS FOR LARGE VOCABULARY CONTINUOUS SPEECH RECOGNITION USING A HYBRID PHONEME-WORD LATTICE

(75) Inventors: Moshe Wasserblat, Maccabim (IL); Ronen Laperdon, Modi'in (IL); Dori Shapira, Sde Gat (IL)

(73) Assignee: Nice Systems Ltd., Ra'anana (IL)

( * ) Notice: Subject to any disclaimer, the term of this patent is extended or adjusted under 35 U.S.C. 154(b) by 520 days.

(21) Appl. No.: 12/941,057

(22) Filed: Nov. 7, 2010

(65) Prior Publication Data

US 2012/0116766 A1 May 10, 2012

(51) Int. Cl.
G10L 15/00 (2013.01)
G10L 15/28 (2013.01)
G10L 15/04 (2013.01)
G10L 15/08 (2006.01)

(52) U.S. Cl.
CPC ....................................... *G10L 15/08* (2013.01)
USPC ............................ 704/255; 704/251; 704/231

(58) Field of Classification Search
USPC ............................... 704/231–257, 270, 270.1, 704/E17.001–E15.05
See application file for complete search history.

(56) References Cited

U.S. PATENT DOCUMENTS

| | | | |
|---|---|---|---|
| 6,990,448 B2 * | 1/2006 | Charlesworth et al. | 704/243 |
| 7,181,398 B2 * | 2/2007 | Thong et al. | 704/254 |
| 7,912,699 B1 * | 3/2011 | Saraclar et al. | 704/9 |
| 2004/0249637 A1 * | 12/2004 | Baker | 704/239 |
| 2007/0033003 A1 * | 2/2007 | Morris | 704/9 |
| 2007/0055508 A1 * | 3/2007 | Zhao et al. | 704/226 |
| 2007/0088548 A1 * | 4/2007 | Yamamoto et al. | 704/239 |
| 2010/0324901 A1 * | 12/2010 | Carter et al. | 704/255 |

OTHER PUBLICATIONS

Deligne et al. "Inference of variable-length linguistic and acoustic units by multigrams". Speech Communication 23 (1997), p. 223-241.*

Szöke et al. "Hybrid word-subword decoding for spoken term detection". In Proc. Speech search workshop at SIGIR, Singapore, ACM 2008, pp. 42-48.*

Deiigne, S., Yvon, F., and Bimbot F. (Sep. 1995). Variabie-length sequence matching for phonetic transcription using joint multigrams, In Eurospeech-1995, 2243-2246.

* cited by examiner

*Primary Examiner* — Jesse Pullias
(74) *Attorney, Agent, or Firm* — Soroker Agmon

(57) ABSTRACT

A method and apparatus combining the advantages of phonetic search such as the rapid implementation and deployment and medium accuracy, comprising steps and components for receiving the audio signal captured in the call center environment, extracting a multiplicity of feature vectors from the audio signal, creating a phoneme lattice from the multiplicity of feature vectors wherein the phoneme lattice comprising one or more allophone and each allophone comprising two or more phonemes, creating a hybrid phoneme-word lattice from the phoneme lattice and extracting the word by analyzing the hybrid phoneme-Word lattice.

27 Claims, 5 Drawing Sheets

METHOD AND APPARATUS FOR LARGE VOCABULARY CONTINUOUS SPEECH RECOGNITION USING A HYBRID PHONEME-WORD LATTICE

TECHNICAL FIELD

The present disclosure relates to audio analysis in general, and to large vocabulary continuous speech recognition, in particular.

BACKGROUND

Large organizations, such as commercial organizations, financial organizations or public safety organizations conduct numerous interactions with customers, users, suppliers or other people or entities on a daily basis. Many of these interactions are vocal, or at least comprise a vocal component, such as an audio part of a video or face-to-face interaction. In order to get insight into the data conveyed by these interactions, the interactions are captured and often recorded.

The interactions can be used for a multiplicity of purposes, including but not limited to quality assurance of the handling personnel, getting insight into the customers' needs, obtaining better understanding of the pros and cons of the organization, and more.

However, in order to achieve many of these purposes, it is required to know what was said in the interaction. Since listening or manually transcribing a large volume of interactions is impractical, it is required to automatically obtain the text using speech to text methods.

Developing a speech recognition engine is a complex task that requires expertise in a multiplicity of subjects, including linguistics, phonology, signal processing, pattern recognition, or others. Developing speech recognition for call center environments presents even further challenges, including handling spontaneous speech, very large vocabulary, multiple and unknown speakers having a wide variety of accents, a noisy environment, low audio quality due to compression of the audio input, and others.

In addition, adaptation and update of speech recognition systems to a specific environment of a call center, as related to the used equipment, common vocabulary, domain, required accuracy, and other factors is also required. Some factors, and in particular the vocabulary used in the call center may require frequent updates, for example when names of new products or competitors are used.

The main existing technologies for obtaining text from audio include phonetic search and speech to text.

Phonetic search relates to indexing the audio and producing a lattice of phonemes from an audio input. The lattice can then be searched for any required words or terms.

The advantages of phonetic search include: rapid implementation and deployment; low CPU consumption for indexing; reduced dependence of the phonetic indexing on the particular language spoken in the audio or the domain relatively to speech to text; easy switching between languages; low maintenance and tuning requirements; and high detection rate, also referred to as high recall rate or low false positive rate. In addition, the words that can be searched for are not required to be known in advance, so that terms that become known at a later time can be searched for within an earlier produced lattice.

The disadvantages of phonetic indexing include: relatively slow search for terms, compared to search on text; relatively large number of false negative for similarly-sounding or short terms, i.e., medium precision; proprietary and unreadable output format which does not support free search and forces the user to use proprietary search, i.e., the search engine associated with the indexing product; and high storage requirements.

Speech to text relates to providing the full transcription of an audio input. The advantages of speech to text include obtaining the full text spoken within the audio, thus enabling: detailed analysis; automatic discovering; rapid searching for words; and compact storage requirements.

The disadvantages of speech to text include: low detection rate, i.e., high false positive rate; high CPU consumption for indexing, relatively to phonetic search; high dependence on language and domain, which may require specific development and frequent updates; and long deployment and tuning process. In addition, speech-to-text techniques do not enable searching for words which were unknown at the time the audio was indexed, such as out-of-vocabulary terms.

Thus, none of these methods complies with the needs of obtaining text with high accuracy and high detection from large volumes of captured or recorded vocal interactions.

There is therefore a need for a method and apparatus for speech recognition. The speech recognition should provide high accuracy relative to phonetic search, be efficient as related to processing speed as well as to storage requirements, and should enable fast adaptation to various environments and easy updating to changes in an environment.

SUMMARY

An apparatus and method for extracting a term from an audio signal.

One aspect of the disclosure relates to a method for extracting a term comprising an one or more words from an audio signal captured in a call center environment, comprising receiving the audio signal captured in call center environment; extracting a multiplicity of feature vectors from the audio signal; creating a phoneme lattice from the multiplicity of feature vectors, the phoneme lattice comprising one or more allophones, each allophone comprising two or more phonemes; creating a hybrid phoneme-word lattice from the phoneme lattice; and extracting the word by analyzing the hybrid phoneme-word lattice. Within the method, creating the phoneme lattice optionally comprises performing Viterbi decoding on the feature vectors. Within the method, creating the phoneme lattice optionally utilizes a speech model and a non-speech model created from audio inputs captured in the call center environment. Within the method, the speech model and the non-speech model are optionally created by a method comprising: recognizing speech and non-speech segments within the audio inputs; estimating an initial speech model and an initial non-speech model; normalizing the initial speech model or the initial non-speech model into a speech model or a non-speech model; and adapting the speech model or the non-speech model. Within the method, creating the phoneme lattice optionally utilizes a joint multigram statistic model. Within the method, creating the hybrid phoneme-word lattice optionally comprises performing word beam search or stack/A* decoding on the phoneme lattice. Within the method, creating the hybrid phoneme-word lattice optionally utilizes a contextual word sequence model.

Within the method, the contextual word sequence model is optionally generated by a method comprising: performing domain based large vocabulary speech recognition of audio input; performing a Smoothing-Turing/Backoff-Katz/Kneser-Ney estimation; and performing contact context adaptation. The method can further comprise performing one or more steps selected from the group consisting of: web adaptation; unsupervised adaptation; word confidence estimation; and multi-pass decoding. Within the method, analyzing the hybrid phoneme-word lattice optionally comprises one or more steps selected from the group consisting of: text retrieval; word search; out-of-vocabulary word search; evaluation; error correction; meta data extraction; and N-best selection.

Another aspect of the disclosure relates to an apparatus for extracting a term comprising one or more words from an audio signal captured in a call center environment, comprising: a capture device for capturing the audio signal in the call center environment; a feature extraction component for extracting a multiplicity of feature vectors from the audio signal; an allophone decoding component for creating a phoneme lattice from the multiplicity of feature vectors, the phoneme lattice comprising one or more allophones, each allophone comprising two or more phonemes; a word decoding component for creating a hybrid phoneme-word lattice from the phoneme lattice; and an analysis component for analyzing the hybrid phoneme-word lattice. Within the apparatus, the allophone decoding component optionally comprises a Viterbi decoder. Within the apparatus, the allophone decoding component optionally receives a speech model and a non-speech model. Within the apparatus, the allophone decoding component optionally receives a joint multigram statistic model. Within the apparatus, the word decoding component optionally receives a contextual word sequence model. Within the apparatus, the word decoding component optionally comprises a word beam search component or a stack/A* decoding component. The apparatus can further comprise a storage device for storing the phoneme lattice or the hybrid phoneme-word lattice. Within the apparatus, the analysis component optionally comprises one or more components selected from the group consisting of: a text retrieval component; a word search component; an out-of-vocabulary word search component; an evaluation component; an error correction component; a meta data extraction component; and an N-best selection component.

Yet another aspect of the disclosure relates to a computer readable storage medium containing a set of instructions for a general purpose computer, the set of instructions comprising: capturing an audio signal in a call center environment extracting a multiplicity of feature vectors from the audio signal; creating a phoneme lattice from the multiplicity of feature vectors, the phoneme lattice comprising one or more allophones, each allophone comprising two or more phonemes; creating a hybrid phoneme-word lattice from the phoneme lattice; and analyzing the hybrid phoneme-word lattice.

BRIEF DESCRIPTION OF THE DRAWINGS

The present invention will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

The disclosed method and apparatus overcome the disadvantages of the prior art by providing a novel method and apparatus for large vocabulary continuous speech recognition (LVCSR). The method and apparatus are particularly useful for environments in which it is required to recognize speech in large volumes of audio as spoken by a multiplicity of unknown speakers having a multiplicity of accents, and in which the spoken vocabulary is frequently updated.

The method and apparatus extract feature vectors from the audio signal, and then decode the feature vectors into an allophone lattice. A phoneme is a basic speech unit, while a phone is a combination of one or more phonemes. For example, the "k" in "keep" and in "kettle" is the same phoneme, but the combination with the following phoneme creates different phones. An allophone is a sequence of one or more phonemes, such as a mono-phone, a bi-phone, a tri-phone, i.e., a sequence of two or three phonemes respectively, or the like. The decoding is thus aimed at finding the best, i.e., the most probable allophone N-best sequences out of the feature vector sequence. The output is an allophone lattice wherein each allophone branch is associated with a time tag and probability score. The allophones are not necessarily aligned, i.e., the lattice can comprise a first phoneme sequence between time points 1 second and 2.5 seconds, and a second phoneme sequence between time points 1.5 second and 2 seconds.

The allophone lattice is then processed by a word decoder which searches for the best word sequences given the allophone lattice probabilities, pronunciation lexicon, and context model probabilities. The output of the word decoder is a hybrid phoneme-word lattice in which each allophone and each word branch has a time tag and a probability score.

An analysis phase is then employed for extracting the required text from the hybrid phoneme-word lattice.

Figure 1:
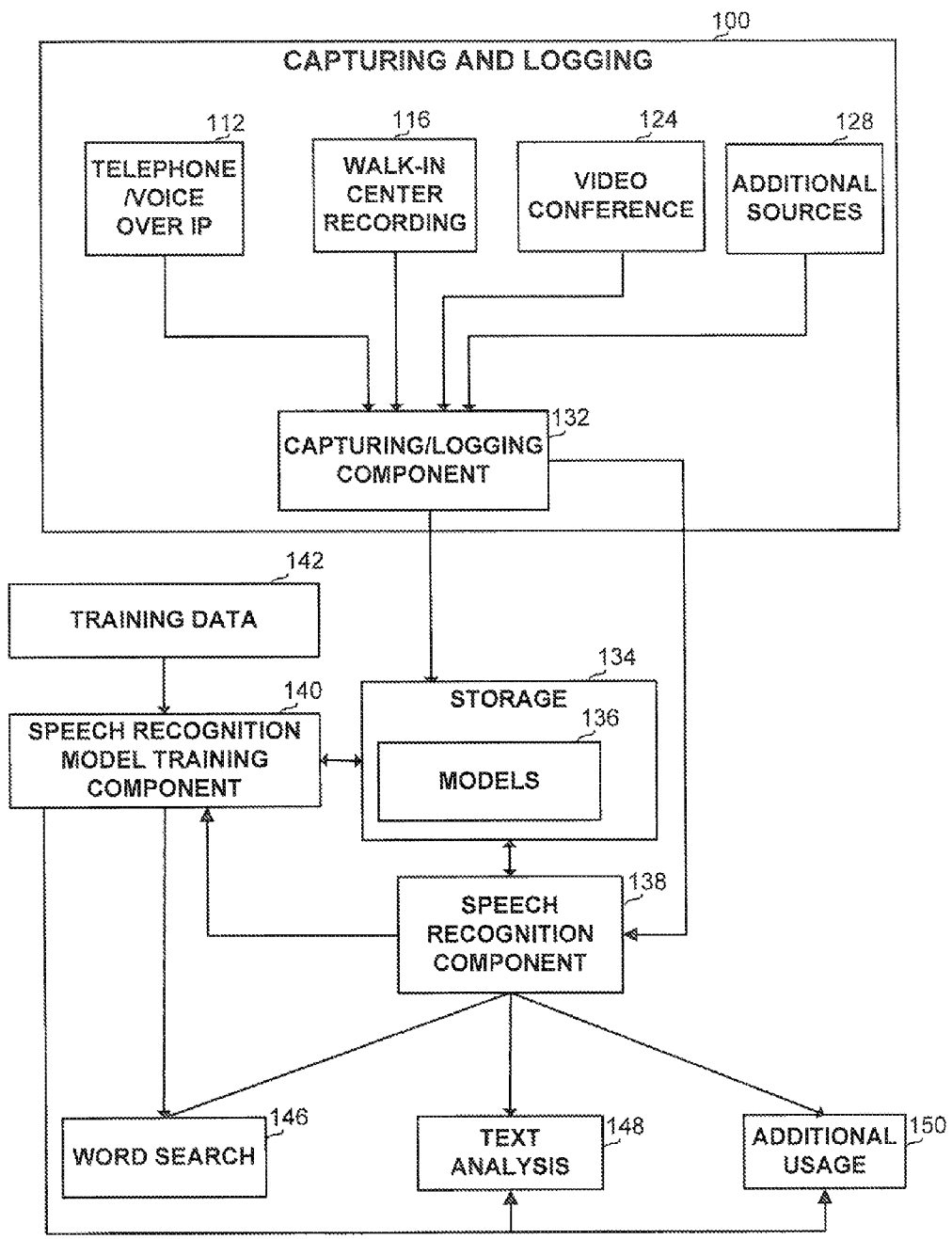
FIG. 1 is a block diagram of the main components in a typical environment in which the disclosed method and apparatus are used.

Referring now to FIG. 1, showing a block diagram of the main components in a typical environment in which the disclosed method and apparatus are used. The environment is preferably an interaction-rich organization, typically a call center, a bank, a trading floor, an insurance company or another financial institute, a public safety contact center, an interception center of a law enforcement organization, a service provider, an internet content delivery company with multimedia search needs or content delivery programs, or the like. Segments, including broadcasts, are captured, thus generating input information of various types. The segments include interactions or parts thereof with customers such as telephone calls, chats, e-mail, and social media, the interactions made or received by users, organization members, suppliers or other parties The information types optionally include auditory segments, video segments, textual interactions, and additional data. The capturing of voice interactions, or the vocal part of other interactions, such as video, can employ many forms, formats, and technologies, including trunk side, extension side, summed audio, separate audio, various encoding and decoding protocols such as G729, G726, G723.1, and the like. The interactions are captured using capturing or logging components 100. The vocal interactions usually include telephone or voice over IP sessions 112. Telephone of any kind, including landline, mobile, satellite phone or others is currently an important channel for communicating with users, colleagues, suppliers, customers and others in many organizations. The voice typically passes through a PABX (not shown), which in addition to the voice of two or more sides participating in the interaction collects additional information discussed below. A typical environment can further comprise voice over IP channels, which possibly pass through a voice over IP server (not shown). It will be appreciated that voice messages or conferences are optionally captured and processed as well, and that the handling is not limited to two-sided conversations. The interactions can further include face-to-face interactions, such as those recorded in a walk-in-center 116, video conferences 124 which comprise an audio component, and additional sources of data 128. Additional sources 128 may include vocal sources such as microphone, intercom, vocal input by external systems, broadcasts, files, streams, or any other source. Additional sources may also include non vocal sources such as e-mails, chat sessions, screen events sessions, facsimiles which may be processed by Object Character Recognition (OCR) systems, or others. The additional sources may thus include textual documents which can be used as is to enrich the texts extracted from audio signals and update the vocabulary used in the environment.

Data from all the above-mentioned sources and others is captured and optionally logged by capturing/logging component 132. Capturing/logging component 132 comprises a computing platform executing one or more computer applications as detailed below. The captured data is optionally stored in storage device 134 which is preferably a mass storage device, for example an optical storage device such as a CD, a DVD, or a laser disk; a magnetic storage device such as a tape, a hard disk, Storage Area Network (SAN), a Network Attached Storage (NAS), or others; a semiconductor storage device such as Flash device, memory stick, or the like. The storage can be common or separate for different types of captured segments and different types of additional data. The storage can be located onsite where the segments or some of them are captured, or in a remote location. The capturing or the storage components can serve one or more sites of a multi-site organization. A part of, or storage additional to storage device 134 is model storage 136 that stores the relevant models, including for example the allophone lattice, the hybrid word-phoneme lattice, language model, domain model, joint multigram statistic model or contextual word sequence model, which are determined via training as detailed below, and used in run-time for generating hybrid phoneme-word models from interactions. Storage device 134 can comprise a single storage device or a combination of multiple devices. Speech recognition component 138 generates text from the interactions, i.e., creates a lattice and either outputs text or enables any search for words within the lattice. In addition, the apparatus further comprises speech recognition model training component 140 for training models upon training data 142.

The output of speech recognition component 138 and optionally additional data may be used by word or term search component 146 for searching for words or terms, whether known at the time the interactions underwent speech recognition or new words or terms, such as names of new products, services, competitors, or the like. A term generally refers to a sequence of one or more words.

The output of speech recognition component 138 can also be stored in a storage device such as storage device 134 for further use. The output can be saved in any required general or proprietary indexing format, such as Lucene, which may enable fast search methods.

The results can further be transferred to text analysis component 148, for performing additional analysis on the text resulting from speech recognition component 138, including for example categorization, clustering, root cause analysis, trend detection, playback with text presentation, report generation components, alert generation components, or others.

The apparatus may comprise one or more computing platforms, executing components for carrying out the disclosed steps. The computing platform can be a general purpose computer such as a personal computer, a mainframe computer, or any other type of computing platform that is provisioned with a memory device (not shown), a CPU or microprocessor device, and several I/O ports (not shown). The components are preferably components comprising one or more collections of computer instructions, such as libraries, executables, modules, or the like, programmed in any programming language such as C, C++, C#, Java or others, and developed under any development environment, such as .Net, J2EE or others. Alternatively, the apparatus and methods can be implemented as firmware ported for a specific processor such as digital signal processor (DSP) or microcontrollers, or can be implemented as hardware or configurable hardware such as field programmable gate array (FPGA) or application specific integrated circuit (ASIC). The software components can be executed on one platform or on multiple platforms wherein data can be transferred from one computing platform to another via a communication channel, such as the Internet, Intranet, Local area network (LAN), wide area network (WAN), or via a device such as CDROM, disk on key, portable disk or others.

Figure 2:
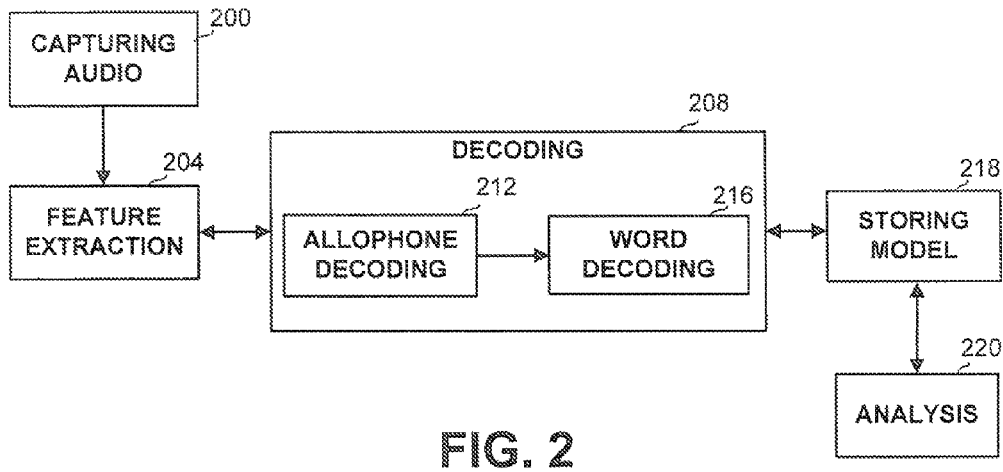
FIG. 2 is a flowchart of the main steps in a method for large vocabulary continuous speech recognition, in accordance with the disclosure.

Referring now to FIG. 2, showing a flowchart of the main steps in a method for performing speech to text of an audio signal.

At 200 the audio signal is captured using a capture device as detailed in association with FIG. 1 above.

At 204 the audio signal is encoded by dividing the audio signal into time frames and extracting a feature vector representing the audio signal at each time frame. The time frames can be of about 5 mSec to about 500 mSec in length, and optionally of about 20 mSec. The extracted features may include Mel Frequency Cepstral Coefficients (MFCC) features, which represent the discrete cosine transform of the log-spectral energies of the speech segment. Other features include Delta Cepstral Mel Frequency Cepstral Coefficients (DMFCC) which are determined using a first order orthogonal polynomial temporal fit over at least +/− two feature vectors (at least two to the left and at least two to the right over time) from the current vector. The feature vectors may also be channel normalized to remove linear channel convolution effects. Subsequent to the utilization of Cepstral features, linear convolution effects appear as additive biases, so Cepstral mean subtraction (CMS) is used. The use of the MFCC features and the associated DMFCC features is exemplary only. In other embodiments spectral energy transform and associated computations or any other types of acoustic and non-acoustic features can be used. The feature vectors can also include any other spectral or non-spectral features.

At 208 the feature vectors are decoded in two main steps: allophone decoding 212 for extracting sequences of one or more phonemes from the feature vectors, and word decoding 216 for extracting word sequences from the phoneme lattice. Unlike prior art technologies, in which word decoding is performed over the feature vectors, the word decoding is performed over the phoneme lattice, to create a hybrid phoneme-word model.

At 218 the hybrid phoneme-word lattice is stored on a storage device, such as storage device 134 of FIG. 1.

At 220, further analysis is performed over the hybrid phoneme-word lattice. Analysis may include extracting continuous text, searching for a particular word, or any other advanced analysis. Allophone decoding 212, word decoding 216 and analysis steps 220 are detailed in association with FIGS. 3A to 3C below.

Figure 3A:
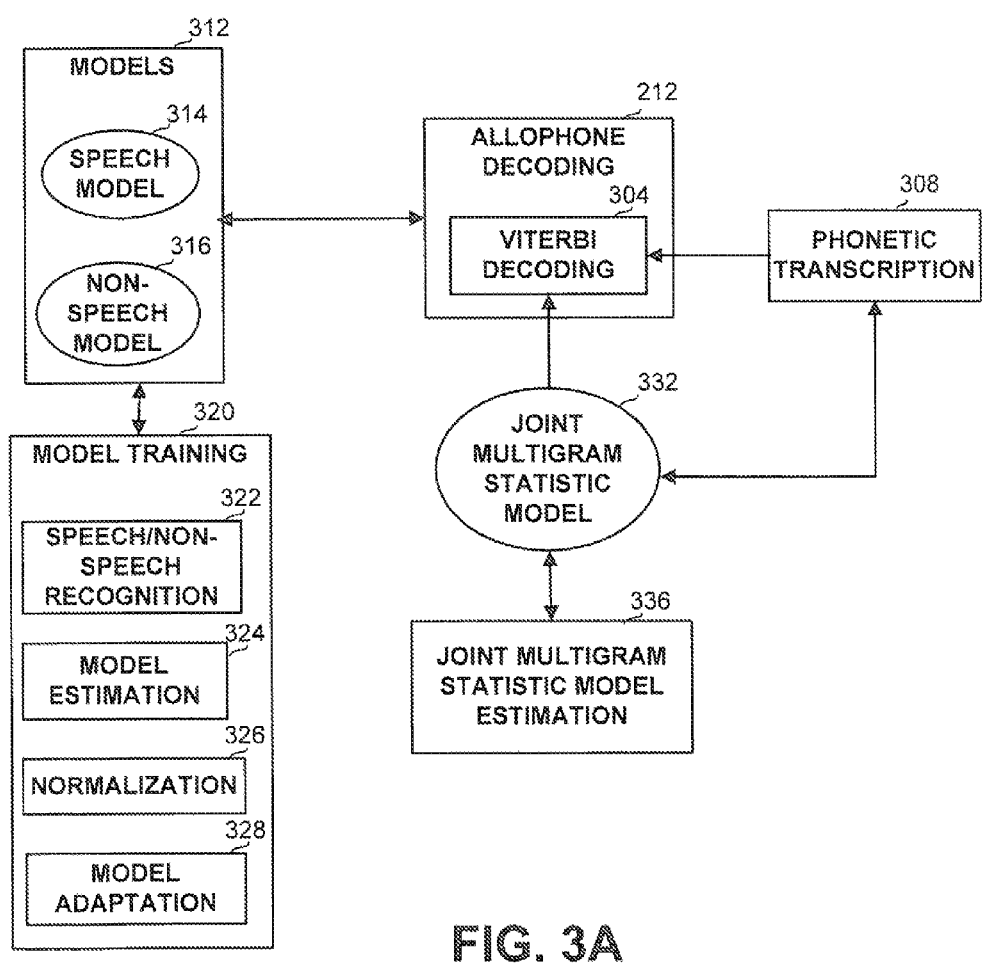
FIG. 3A is a flowchart of the main steps in a method for allophone decoding of an audio signal, in accordance with the disclosure.

Referring now to FIG. 3A, showing a flowchart of the main steps in a method for allophone decoding step 212 of FIG. 2.

Allophone decoding 212 comprises Viterbi decoding 304, which returns the best allophones, being the most probable allophones given the input feature vectors. A Viterbi algorithm is generally a dynamic programming algorithm for finding the most likely sequence of events. The allophones are not necessarily aligned, and may partially or fully overlap. Viterbi decoding 304 receives as input the feature vectors sequence of the analyzed time frame, for example the time slot of t=1 to N extracted at feature extraction 204, and HMM models 312, and outputs an allophone lattice comprising allophone branches and for each allophone branch a time tag and a probabilistic score.

Viterbi decoding 304 may also receive one or more phoneme sequences generated by phonetic transcribing 332, as detailed below.

HMM models 312 comprise speech model 314 and non-speech model 316. Two models are required since the audio captured at contact centers may contain speech as well as non speech events, such as silence, music, tones or the like. These events should be detected and excluded because speech processing may be highly sensitive to non-speech segments. Therefore two HMM models are trained, speech model 314 from speech segments and non-speech model 316 from non-speech segments. These models are used to decode the audio signal into speech and non-speech segments.

In some embodiments, the distinction whether a particular feature vector represents speech or non-speech is performed prior to Viterbi decoding 304.

HMM models 312 are trained at model training 320, which comprise speech/non-speech recognition 322, model estimation 324, normalization 326, and model adaptation 328.

Speech/non-speech recognition 322 is used for decoding the feature vectors into speech and non-speech, so that only speech feature vectors are used in constructing speech model 314, and correspondingly for non-speech model 316.

Model estimation 324 trains the models from training data consisting of speech and corresponding orthographic transcriptions.

For example, the English language comprises about 40 phonemes. Thus, a tri-phone model may initially contain about 40×40×40=64000 tri-phone models. Each model requires a multiplicity of parameters, such as the HMM's parameters: mean averages of Gaussian Mixture Models, variances of Gaussian Mixture Models transition probabilities or the like. In order to reduce the number of parameters to be evaluated, hierarchical classifiers may be used, such as decision tree clustering (CART). Using hierarchical classifiers or other methods, can in some embodiments reduce the number of active tri-phones from about 64000 to around 10000 by grouping similarly-sounding tri-phones that have low number of samples in the training set.

The training process is an iterative task which has to converge to minimal entropy HMM parameter. However, since the corpus may not be well aligned due to human errors, training may not converge. In such cases, it may be required to improve the data, for example by deleting music, ambient noise and non-speech segments, or to expand the corpus by obtaining more audio samples that represent well the target population.

Model estimation 324 first constructs an initial speech model and an initial non-speech model for mono-phones, using for example a Viterbi iteration method. Then using an alignment process, more training data is added, and tri-phones are trained based on the mono-phones. On each iteration, the model is refined using more Viterbi iterations, followed by alignment and splitting of the model's mixtures, which may be referred to as force-alignment training.

Normalization 326 is used to condition the input audio, usually in the features domain, e.g., provide a more compact representation of the short speech segment containing for example LPC, MFCC, formants location features, or the like. Normalization 326 is optionally performed during a pre-processing phase, in order to minimize the effect of variation caused by the environment and the different physical characteristics of the speakers. Normalization 326 may use mean and variance normalization which compensates for channel variation, and vocal-tract-length normalization which compensates for speaker variation.

Model adaptation 328 is used for compensating for degraded accuracy resulting from the mismatch between training and test corpuses. Adaptation 328 adapts the HMM models given new specific domain data. For example, Maximum A-Posteriori (MAP) weighs the HMM model parameters so that as the adaptation data is accumulated, the parameters tend asymptotically to the adaptation domain, which means that for large amount of adaptation data the HMM model will completely represent the new domain. ML-Linear Regression (MLLR) transforms and cluster builds a set of linear transforms to map an existing model into a new adaptive model so that the likelihood of the adaptation data is maximized. Cluster Adaptive Training (CAT) replaces the signal model with a cluster of more specific models where each model can be trained on more homogenous data.

Normalization 326 and model adaptation 328 are intended for improving the robustness of HMM models 312, and to minimize the influence of noisy data and imperfect human input.

Viterbi decoding 304 may also receive the output of phonetic description 308, which uses joint multigram statistic model 332. Joint multigram statistic model 332 contains the phonetic transcription of out-of-dictionary words. Thus, Viterbi decoding 304 receives phoneme sequences in addition to those appearing in speech model 314. Since speech model 314 was generated upon a limited training set, the pronunciation lexicon, i.e., Joint multigram statistic model 332 enables the introduction of additional sequences, not present in the training data.

Joint multigram statistic model 332 is generated by joint multigram statistical model estimation 336, which uses a statistical transcriber that generates the grapheme-to-phoneme conversion, i.e., converts a letter sequence, into a phoneme sequence, even if the sequence is morphologically illegal. Estimating the multigram statistic model is detailed, for example in Sabine et al. "Variable-Length Sequence Matching for Phonetic Transcription Using Joint Multigrams", published in EUROSPEECH-1995, 2243-2246, incorporated herein by reference in its entirety.

In prior art systems, grapheme-to-phoneme conversion has neglected the alignment problem. In prior art embodiments, handcrafted rules are used to align letters and phonemes. This alignment is used as a pre-processing stage to machine learning techniques which perform the actual mapping. This alignment is time consuming and inconvenient in developing a grapheme-to-phoneme conversion system for a new language. In the current disclosure, however, joint multigram models are used, in which the alignment can be inferred from N-gram statistics. A grapheme-phoneme joint multigram, or graphone for short, is a pair q=(g,φ), comprising a letter sequence g and one or more phoneme sequences φ of possibly different lengths. It is assumed that for each word its orthographic form and its pronunciation are generated by a common sequence of graphones. For example, the pronunciation of "speaking" may be regarded as a sequence of five phonemes:

$$\frac{\text{"speaking"}}{[spi:kin]} = \frac{s \quad p \quad ea \quad k \quad ing}{[s] \quad [p] \quad [i:] \quad [k] \quad [in]}$$

However the segmentation into graphones may be non-unique. The joint probability q=(g,φ) is determined by summing over all matching phoneme sequences that can match the letter sequence.

Joint multigram statistical model estimation 336 uses a training sample in two phases. First unigram statistics are used to infer a grapheme-phoneme joint multigram model. This is done by using a maximum likelihood or a Viterbi training approach. The later stage is used to co-segment the corpus into a stream of grapheme-phoneme joint multigrams. These are used to train the bigram and trigram models.

Most of the graphones are assigned negligibly small probabilities. In order to reduce the model size, avoid sparseness and save execution time, a threshold τ can be set on the expected number of occurrences of graphones, e(q,θ) i.e., $$\hat{e}(q, \vartheta) = \begin{cases} 0 & \text{if } e(q, \vartheta) < \tau \\ e(q, \vartheta) & \text{otherwise} \end{cases}$$

wherein threshold τ can be set empirically.

Figure 3B:
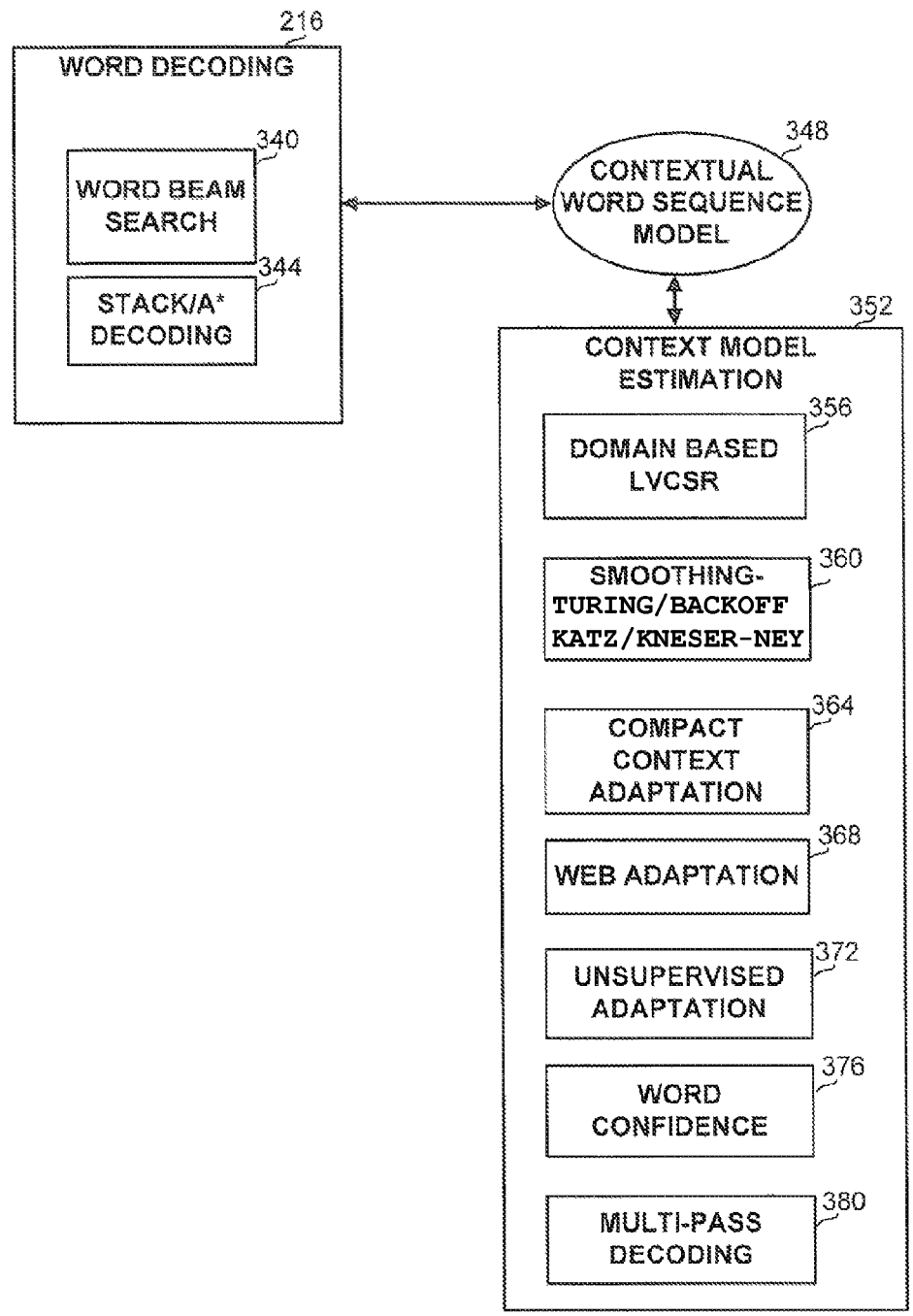
FIG. 3B is a flowchart of the main steps in a method for word decoding based on an allophone lattice, in accordance with the disclosure.

Referring now to FIG. 3B, showing a flowchart of the main steps in a method for performing word detection 216 of FIG. 2.

Word decoding 216 searches for actual words and word sequences within the phoneme lattice generated by allophone decoding 212, and produces a hybrid phoneme-word lattice.

Word decoding 216 receives a language model, containing the word and word-sequence probabilities within the language. Word decoding 216 comprises word beam search 340 which utilizes Viterbi decoding with pruning to decode the best word sequence given the phoneme lattice and a context domain model.

The used context domain model relates to free speech and can comprise thousands or even tens of thousands of words. Therefore, for recognizing words within the phoneme lattice, a tree-structured recognition network is required which may perform efficient search. In some embodiments, token passing algorithm can be used for keeping attractive paths within the lattice.

It will be appreciated that the word network is initially large, since it contains all possible connections between words in the lexicon. Pruning reduces the number of possible paths, by eliminating paths having probabilities below a threshold.

Alternatively, word decoding 216 comprises Stack/A* decoding 344 instead of word beam search 340. Stack/A* decoding 344 employs a different algorithm. The Stack/A* decoding algorithm avoids the Viterbi approximation and allows a one-pass technique to decode the word lattice.

Word decoding 216 searches the phoneme lattice in accordance with a language model, comprising the words in the language and their probabilities, as well as word combination and their probabilities, which amount to a large volume of data. In order to reduce the model, context model estimation 352 is used for generating contextual word sequence model 348 which is smaller in size and better adapted for the environment than the standard language model.

Context model estimation 352 comprises domain based large vocabulary recognition (LVCSR) 356, which relates to a lexicon that specifically represents the domain and is hence more accurate than estimating a global model. Domain based LVCSR is required for generating an initial context dictionary, comprising words and word combinations relevant for the environment, thus improving the accuracy and efficiency of word beam search 340 or Stack/A* decoding 344, by focusing on the domain-specific vocabulary. For example in financial transaction institutions, words related to an amount of money and payment method are most required in the analysis. There is generally a trade-off between the accuracy of an LVCSR engine and the computing resources it requires. Therefore, domain based LVCSR 356 is responsible for gaining efficiency and accuracy while compromising on accuracy in detecting words that are less relevant to the domain or the speaker.

The model generated on domain based LVCSR 356 is further enhanced by Smoothing-Turing/Backoff-Katz/Kneser-Ney estimation 360, in which statistical models of word sequences are estimated for specific contexts, referred to as context models or language models. In this model probabilities are assigned to word sequences, which may be considered when the words are searched for during final searching.

Context model estimation 352 further comprises compact context adaptation 364 for reducing the language model in accordance with the particular context. Compact context adaptation 364 uses specific content as required and assigns higher probabilities to words and word combinations which are more likely to be said in the particular environment. For example, a combination of numbers, followed by the word "dollars" is likely in a financial environment such as a bank.

Another method, which can be used as an alternative to context model estimation 352, or as an addition to it, is distance-based word pruning. In this method, the distances between the words in the lexicon are pre-calculated, using any distance measure, such as edit distance, also known as Levenshtein distance, phonemes/allophone-histograms distance, or the like. This calculation returns a vast distance matrix between any word and any other word. The distances are used for dividing the words into groups. For every group a "centroid" is determined, which is a phoneme string that best represents the group, by finding the point having minimum distance to all other words in that group, while taking into account the different scores (or weights) of the words.

The centroid may be a non valid word, but it is a searchable phoneme string. During word search on the phoneme lattice, instead of searching for all possible thousands of words, only the pre-determined centroids are searched, and a likelihood measure is obtained for each of them. The triangle inequality, geometrically denoted as AB+BC>AC in a triangle ABC, is then used for removing or pruning words that are too far away from the phoneme lattice, i.e., do not comply with the following criteria:

score(Word)≤score(centroid)+dist.(centroid,Word) for any centroid.

Thus searching the words whose score is less than a predefined threshold, wherein the threshold can be set for example in an interface part of the application or in any other manner.

Since the distance dist.(centroid, Word) is required to be small in order for the division into groups to be meaningful, each group can be further divided into sub-groups, and a centroid can be determined for every sub-group as well. Then the search can continue into the sub-groups only if the group satisfies the above equation, leading to a smaller group of possible words. This process can be repeated, generating tree-structured groups of words, which are pruned during recognition. The tree structure allows for relatively fast and efficient search for a large number of groups, as well as quick adaptation of the centroids in case of an online language model adaptation, by treating each group or sub-group as a lexicon of its own.

Context model estimation 352 further comprises web adaptation 368, which automatically downloads domain specific text from the web or another source and weighs its relevancy to the specific context model. If the weights exceed a given threshold, the words will be assigned a higher probability. This step overcomes the difficulty of obtaining text that represents call-center interactions, since even if call samples are available, transcription services are time consuming and expensive.

Context model estimation 352 comprises unsupervised adaptation 372, which in a possibly ongoing manner uses the output of the LVCSR engine and updates the context model over time. Thus, the context model is updated to better represent the current domain-specific vocabulary.

Context model estimation 352 further comprises word confidence estimation 376, which assigns a normalized confidence score to each word in the word lattice, based for example on their likelihood sequence in a given context. The normalized probabilities improve search and text mining accuracy, as words having lower confidence are discarded. Since confidence scores can vary in an unlimited range, normalization of the confidence is important for performing meaningful comparisons between various options and selecting the most probable word combination.

Yet another sub step of context model estimation 352 is multi-pass decoding 380, also referred to as N-best lattices. In multi-pass decoding 380 allophone decoding 212 is extended to an N-best lattice, i.e., to return multiple potential words or phrases instead of a single best word, and then use the same or another high-level context model, such as a domain context model for re-ranking the multiple options. This can also be carried out using the Stack/A* algorithm.

Figure 3C:
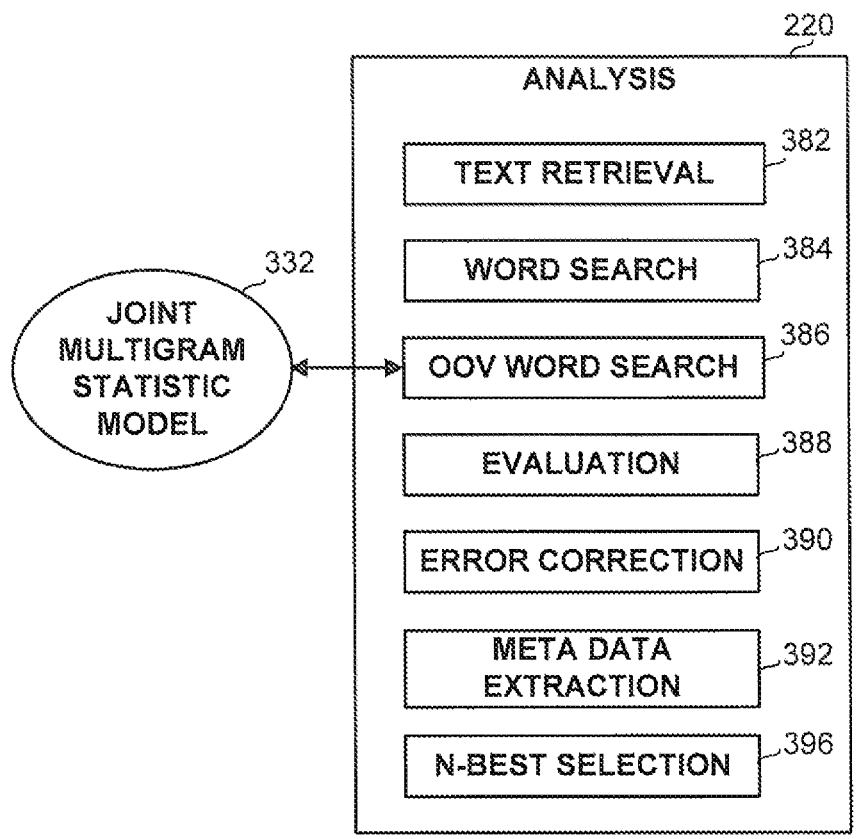
FIG. 3C is a flowchart of the main steps in a method for analysis of a hybrid phoneme-word lattice, in accordance with the disclosure.

Referring now to FIG. 3C, showing a flowchart of the main steps in a method for analyzing the hybrid phoneme-word lattice produced on decoding 208 of FIG. 2

Analysis steps 220 are intended for using and extracting output from the hybrid phoneme-word lattice generated in decoding 208.

In some embodiments, the various analysis steps are independent, and any of them can be carried out regardless of the others.

Thus, analysis steps 220 comprise text retrieval 382 for obtaining from the word part of the hybrid lattice the most probable full transcription of an audio input.

Text analysis methods such as categorization, root cause analysis, trend analysis, event extraction, reason analysis, clustering or the like can then be applied towards the resulting text.

Word search 384 enables the search for a particular word within the hybrid lattice. In some embodiments, the word is first searched for within contextual word sequence model 348. If the word is found, it is searched within the text part of the hybrid lattice. If the word is not found in the text lattice, a phonetic transcription of the word is obtained using joint multigram statistic model 332, and the phoneme sequence is searched for within the phoneme lattice.

Analysis steps 220 comprise out of vocabulary word search 386, for searching words that are not in the known dictionary of the environment. A phonetic decoding is generated for this joint multigram statistic model 332, and the phoneme sequence is searched for within the phonetic part of the hybrid lattice.

Yet another optional step of analysis steps 220 is evaluation 388 in which the performance is evaluated based on the word error rate metric which is common for speech recognition systems. Evaluation 388 receives a sample speech corpus from the test environment that is manually transcribed. The manual transcription is then compared to the automatic transcription, and an error rate is determined.

Analysis steps 220 may also comprise error correction 390. Error correction 390 utilizes Natural Language Processing (NLP) for detecting out-of-context words and terms in the output lattice, discarding them and thus enhancing the accuracy of the text.

Yet another optional step of analysis steps 220 is meta data extraction 392, for detecting text meta data, such as entity names, for example company names, addresses, places, or the like, sentence boundaries, punctuation, dis-fluencies such as "Haa" or "Hamm", and true casing, such as correct capital letters for names and addresses, thus also improving the accuracy of information extraction algorithms activated on the transcribed text.

Yet another optional step of analysis steps 220 is N-best selection 396, which extends the analysis task to handling an N-best Hybrid lattice, i.e., a lattice that comprises not only the one most probably phoneme sequence or word sequence, but the N most probable ones relevant for any point in time in the input signal.

It will be appreciated that further analysis steps can be performed, including any advance text analysis to be performed on the resulting text, such as categorization, root cause analysis or the like.

Figure 4:
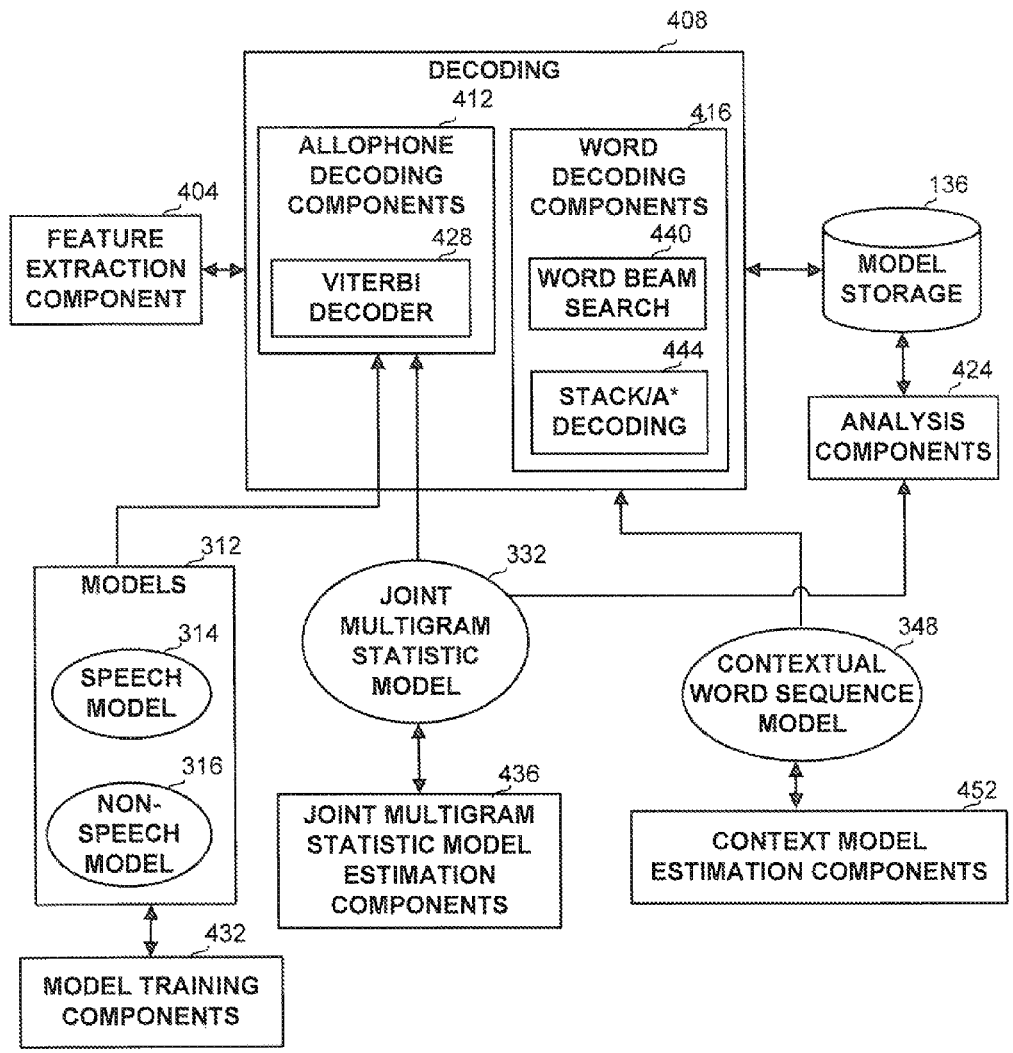
FIG. 4 is a block diagram of the main components in an apparatus for large vocabulary continuous speech recognition, in accordance with the disclosure.

Referring now to FIG. 4, showing the main components in an apparatus for large vocabulary speech recognition.

The apparatus comprises feature extraction component 404 for extracting features from input audio signals, wherein the features can be arranged as feature vectors representing substantially consecutive time frames within the audio signal. A person skilled in the art will appreciate that the time frames may partially overlap but may also be spaced apart, and that the time frames can be uniform or vary in length.

The apparatus further comprises decoding components 408, which comprise allophone decoding components 412 and word decoding components 416.

Allophone decoding components 412 receive the feature vectors extracted by feature extraction component 404 and outputs a phoneme lattice. Allophone decoding components 412 comprise a Viterbi decoder 428, which receives as input HMM models 312, that may include speech model 314 and non-speech model 316.

HMM models 312 are estimated by model training components 432, which may comprise components for speech/non-speech recognition, initial model estimation, and robustness-enhancing components such as normalization and model adaptation components, as detailed in association with the corresponding steps of FIG. 3A above.

Viterbi decoder 428 may also utilize joint multigram statistic model 332, for retrieving the phonetic structure of unknown words. Joint multigram statistic model 332 is estimated by joint multigram statistic model estimation components 436.

Word decoding components 416 receive as input a phoneme lattice as may be produced by allophone decoding components 412, and output a hybrid phoneme-word lattice.

Word decoding components 416 may comprise any one or more decoders which decode the feature vectors into phoneme, such as word beam search component 440, stack/A* decoding component 444 or others.

Word decoding components 416 may use contextual word sequence model 348, which comprises words, word combinations and probabilities thereof, as found in the environment.

Contextual word sequence model 348 is created by context model estimation components 452, which may comprise any one or more of the following components: domain based large scale vocabulary transcription component, smootlling-Turing/Backoff-Katz/Kneser-Ney component, context adaptation component, web adaptation component, unsupervised adaptation component, word confidence component, and multi-pass decoding component, detailed in association with the corresponding steps of FIG. 3B above.

The hybrid phoneme-word lattice and the models may be stored in a storage device, such as model storage 136, and can then be used by analysis components 424.

Analysis components 424 may include any one or more of the following: a text retrieval component; a word search component; an out-of-vocabulary word search component; an evaluation component; an error correction component; a meta data extraction component; and an N-best selection component, detailed in association with the corresponding steps of FIG. 3C above.

The disclosed method and apparatus create and use a hybrid phoneme-word lattice. The word lattice is created upon the phoneme lattice rather than directly from the feature vectors extracted from the audio input, thus combining the advantages of a phonetic recognition engine, being index speed and the option to search for out-of-vocabulary words, with the advantages of continuous speech recognition engine, being the availability of the full text of the audio and domain adaptation.

The combination thus provides textual data combined with phonetic data, which can be integrated into business systems requiring insights into the logic of the organization, and within analysis, search and research tools. The hybrid lattice is compact in size, and provides efficient searching for exact or blurred text, as well as phoneme-based meta data.

The combined lattice enables the search of out-of-vocabulary words, by transforming from a letter sequence into a phoneme sequence. Such words or terms do not have to be morphologically legal, and can thus enable the search for new products, competitors, new slang words, names, or the like.

The combination also enables the adaptation of the used dictionary to the relevant domain, which may need updating over time. This also enables the usage of the obtained text as feedback for obtaining current information about the language or the domain, collecting additional information from external sources such as the web, and improving future performance of the method and apparatus.

The hybrid lattice provides high accuracy of text extraction, useful in various business applications, such as churn prediction. Once the word error rate of the recognized text is under a predetermined threshold, such as 30%, text mining techniques can be used more efficiently.

The method and apparatus enable fast deployment in new environments, languages, or domains. Since the engine receiving the audio is phonetic, training for a new language or accent is relatively short and is language independent.

The method and apparatus are efficient, thus enabling the transcribing of significant volumes of audio. For example, in some embodiments, a small number of computing platforms, for example fewer than 10 platforms may be sufficient to transcribe almost 100% of the interactions captured in a call center, almost in real time, i.e., a short time after the interactions occur. Transcription of a large part of the interactions in the call center provides statistically significant results and enables the organization to obtain important insights into the business. Such processing speed avoids the limitations under which only interactions complying with certain criteria, such as belonging to a certain category were analyzed. Thus, text mining is more useful and more indicative since it is performed over larger volumes of text, thus enabling the identification of new categories.

It will be appreciated by a person skilled in the art that the disclosed method and apparatus are exemplary only and that multiple other implementations can be designed without deviating from the disclosure. It will be further appreciated that components of the apparatus or steps of the method can be implemented using proprietary or commercial products.

It will be appreciated that multiple implementations and variations of the method and apparatus can be designed. Various features, model estimation techniques and searching techniques can be considered and used.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular situation, material, step of component to the teachings without departing from the essential scope thereof. Therefore, it is intended that the disclosed subject matter not be limited to the particular embodiment disclosed as the best mode contemplated for carrying out this invention, but only by the claims that follow.

What is claimed is:

1. A method for extracting a term comprising at least one word from an audio signal captured in a call center environment, comprising:
    receiving the audio signal captured in an environment;
    extracting a multiplicity of vectors of spectrum-based features from the audio signal, wherein the spectrum-based features comprise at least any one of Mel Frequency Cepstral Coefficients (MFCC), Delta Cepstral Mel Frequency Coefficients (DMFCC), or spectral energy transform;
    creating a phoneme lattice from the multiplicity of feature vectors, the phoneme lattice comprising at least one allophone, the at least one allophone comprising at least two phonemes and determined as most probable and correspondingly assigned a probability score;
    creating a hybrid phoneme-word lattice from the phoneme lattice by utilizing a speech model and a non-speech model that were created from the audio signal captured in the call center environment; and
    extracting the word by analyzing the hybrid phoneme-word lattice.

2. The method of claim 1 wherein creating a phoneme lattice comprises performing Viterbi decoding on the feature vectors.

3. The method of claim 1 wherein the audio signal captured in the call center environment comprises non-speech events that include any one of a silence, music or tones.

4. The method of claim 1 wherein the speech model and the non-speech model are created by a method comprising:
   recognizing speech and non-speech segments within the audio inputs;
   estimating an initial speech model and an initial non-speech model;
   normalizing the initial speech model or the initial non-speech model into a speech model or a non-speech model; and
   adapting the speech model or the non-speech model.

5. The method of claim 1 wherein creating a phoneme lattice utilizes a joint multigram statistic model.

6. The method of claim 1 wherein creating the hybrid phoneme-word lattice comprises performing a word beam search or stack/A* decoding on the phoneme lattice.

7. The method of claim 1 wherein creating the hybrid phoneme-word lattice utilizes a contextual word sequence model.

8. The method of claim 7 wherein the contextual word sequence model is generated by a method comprising:
   performing domain based large vocabulary speech recognition of audio input;
   performing a Smoothing-Turing/Backoff-Katz/Kneser-Ney estimation; and
   performing context adaptation.

9. The method of claim 8 further comprising performing at least one step selected from the group consisting of: web adaptation; unsupervised adaptation; word confidence estimation; and multi-pass decoding.

10. The method of claim 1 wherein analyzing the hybrid phoneme-word lattice comprises at least one step selected from the group consisting of: text retrieval; word search; out-of-vocabulary word search; evaluation; error correction; meta data extraction; and N-best selection.

11. The method of claim 1, wherein the spectrum-based features are acoustic features.

12. The method of claim 1, wherein the spectrum-based features are non-acoustic features.

13. The method of claim 1, wherein the hybrid phoneme-word lattice is created based on decoding of words from the phonemes lattice.

14. The method of claim 1, wherein the extraction of a multiplicity of vectors of spectrum-based features is based on overlapping and non-aligned time frames of the audio signal.

15. An apparatus for extracting a term comprising an at least one word from an audio signal captured in a call center environment, comprising:
   a capture device for capturing the audio signal in an environment;
   a feature extraction component for extracting a multiplicity of vectors of spectrum-based features from the audio signal, wherein the spectrum-based features comprise at least any one of Mel Frequency Cepstral Coefficients (MFCC), Delta Cepstral Mel Frequency Coefficients (DMFCC), or spectral energy transform;
   an allophone decoding component for creating a phoneme lattice from the multiplicity of feature vectors, the phoneme lattice comprising at least one allophone, the at least one allophone comprising at least two phonemes and determined as most probable and correspondingly assigned a probability score;
   a word decoding component for creating a hybrid phoneme-word lattice from the phoneme lattice by utilizing a speech model and a non-speech model that were created from the audio signal captured in the call center environment; and
   an analysis component for analyzing the hybrid phoneme-word lattice.

16. The apparatus of claim 15 wherein the allophone decoding component comprises a Viterbi decoder.

17. The apparatus of claim 15 wherein the allophone decoding component receives a speech model and anon-speech model.

18. The apparatus of claim 15 wherein the allophone decoding component receives a joint multigram statistic model.

19. The apparatus of claim 15 wherein the word decoding component receives a contextual word sequence model.

20. The apparatus of claim 15 wherein the word decoding component comprises a word beam search component or a stack/A* decoding component.

21. The apparatus of claim 15 further comprising a storage device for storing the phoneme lattice or the hybrid phoneme-word lattice.

22. The apparatus of claim 15 wherein the analysis component comprises at least one component selected from the group consisting of: a text retrieval component; a word search component; an out-of-vocabulary word search component; an evaluation component; an error correction component; a meta data extraction component; and an N-best selection component.

23. The apparatus of claim 15, wherein the hybrid phoneme-word lattice is created based on decoding of words from the phonemes lattice.

24. The apparatus of claim 15, wherein the extraction of a multiplicity of vectors of spectrum-based features is based on overlapping and non-aligned time frames of the audio signal.

25. A non-transitory computer readable storage medium containing a set of instructions for a general purpose computer, the set of instructions comprising:
   capturing an audio signal in a call center environment;
   extracting a multiplicity of vectors of spectrum-based features from the audio signal, wherein the spectrum-based features comprise at least any one of Mel Frequency Cepstral Coefficients (MFCC), Delta Cepstral Mel Frequency Coefficients (DMFCC), or spectral energy transform;
   creating a phoneme lattice from the multiplicity of feature vectors, the phoneme lattice comprising at least one allophone, the at least one allophone comprising at least two phonemes and determined as most probable and correspondingly assigned a probability score;
   creating a hybrid phoneme-word lattice from the phoneme lattice by utilizing a speech model and a non-speech model that were created from the audio signal captured in the call center environment; and
   analyzing the hybrid phoneme-word lattice.

26. The non-transitory computer readable storage medium of claim 25, wherein the hybrid phoneme-word lattice is created based on decoding of words from the phonemes lattice.

27. The non-transitory computer readable storage medium of claim 25, wherein the extraction of a multiplicity of vectors of spectrum-based features is based on overlapping and non-aligned time frames of the audio signal.

* * * * *